US009321345B2

(12) United States Patent
Lueschen et al.

(10) Patent No.: US 9,321,345 B2
(45) Date of Patent: Apr. 26, 2016

(54) APPARATUS AND METHOD FOR JOINING A HYDRO-FORMED TUBE TO AN EXTRUSION

(71) Applicant: Ford Global Technologies, LLC, Dearborn, MI (US)

(72) Inventors: Gerhard G. G. Lueschen, Ypsilanti, MI (US); Dragan B. Stojkovic, Taylor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/277,381

(22) Filed: May 14, 2014

(65) Prior Publication Data

US 2015/0328977 A1 Nov. 19, 2015

(51) Int. Cl.
*B60K 11/04* (2006.01)
*B21D 26/033* (2011.01)
*B62D 25/08* (2006.01)
*F16B 7/18* (2006.01)

(52) U.S. Cl.
CPC .............. *B60K 11/04* (2013.01); *B21D 26/033* (2013.01); *B62D 25/084* (2013.01); *F16B 7/18* (2013.01); *Y10T 29/49618* (2015.01)

(58) Field of Classification Search
CPC .... B60K 11/04; B62D 25/084; B62D 25/085; B21D 26/033; F16B 7/18; Y10T 29/49618
USPC ............................................... 180/68.4, 68.6
See application file for complete search history.

(56) References Cited

U.S. PATENT DOCUMENTS

| | | | | |
|---|---|---|---|---|
| 4,619,313 A * | 10/1986 | Rhodes et al. | ................... | 165/67 |
| 4,656,801 A * | 4/1987 | Erlam | ............................. | 52/280 |
| 5,597,047 A * | 1/1997 | Thompson et al. | .......... | 180/68.4 |
| 5,660,907 A * | 8/1997 | Skalka | ............................. | 428/67 |
| 5,671,803 A * | 9/1997 | Tepas et al. | ..................... | 165/41 |
| 5,781,956 A * | 7/1998 | Kelsay et al. | ................. | 15/143.1 |
| 6,243,950 B1 * | 6/2001 | Wachiner et al. | ............ | 29/897.1 |
| 6,302,478 B1 * | 10/2001 | Jaekel et al. | .................. | 296/205 |
| 6,386,273 B1 * | 5/2002 | Hateley | ............................ | 165/67 |
| 6,416,119 B1 * | 7/2002 | Gericke et al. | ................ | 296/205 |
| 6,814,400 B2 * | 11/2004 | Henderson et al. | ...... | 296/193.09 |
| 7,044,246 B2 * | 5/2006 | Fujieda | ........................ | 180/68.4 |
| 7,201,398 B1 * | 4/2007 | Christofaro et al. | .......... | 280/781 |
| 7,243,751 B2 * | 7/2007 | Shigematsu | .................. | 180/68.4 |
| 7,243,986 B2 * | 7/2007 | Dupuis et al. | ................. | 296/205 |
| 7,267,394 B1 | 9/2007 | Mouch et al. | | |

(Continued)

FOREIGN PATENT DOCUMENTS

JP S6220763 A 1/1987
JP 2004359164 A 12/2004

*Primary Examiner* — Hau Phan
*Assistant Examiner* — Jacob Meyer
(74) *Attorney, Agent, or Firm* — Jason Rogers; Brooks Kushman P.C.

(57) ABSTRACT

An assembly is provided that includes a front end support frame and radiator support beam. The front end support frame has an end that defines an opening that extends between two facing walls across an inside wall of the tubular structure. The radiator support beam is assembled into the opening in the end of the front end support frame and is attached to the two facing walls. The front end support frame is a hydro-formed tube and the radiator support beam is an extruded part. The radiator support beam includes at least one internal reinforcement wall and an outside wall of the front end support frame is fastened with flow drilling screws to the internal reinforcement wall.

10 Claims, 2 Drawing Sheets

(56) References Cited

U.S. PATENT DOCUMENTS

| | | | |
|---|---|---|---|
| 7,270,368 B2 * | 9/2007 | Aonuma et al. | 296/203.02 |
| 7,281,757 B2 * | 10/2007 | Dupuis et al. | 296/205 |
| 7,441,819 B2 | 10/2008 | Azzouz et al. | |
| 7,488,023 B2 * | 2/2009 | Kapadia et al. | 296/29 |
| 7,547,063 B2 * | 6/2009 | Stojkovic et al. | 296/203.03 |
| 7,757,610 B2 * | 7/2010 | Saxton et al. | 105/404 |
| 7,871,123 B2 * | 1/2011 | Stojkovic et al. | 296/193.09 |
| 7,942,223 B2 * | 5/2011 | Obayashi et al. | 180/68.4 |
| 8,122,988 B2 * | 2/2012 | Obayashi et al. | 180/68.4 |
| 8,151,921 B2 * | 4/2012 | Okabe et al. | 180/68.4 |
| 8,408,344 B2 * | 4/2013 | Williams et al. | 180/68.4 |
| 8,550,545 B1 * | 10/2013 | Stojkovic et al. | 296/193.09 |
| 8,561,741 B2 * | 10/2013 | Kurokawa et al. | 180/68.4 |
| 8,646,554 B2 * | 2/2014 | Takahashi et al. | 180/68.4 |
| 8,662,572 B2 | 3/2014 | Abe et al. | |
| 8,931,233 B2 * | 1/2015 | Cooper et al. | 52/655.1 |
| 2001/0010275 A1 * | 8/2001 | Sasano et al. | 180/68.1 |
| 2001/0050160 A1 * | 12/2001 | Ozawa et al. | 165/67 |
| 2002/0129981 A1 * | 9/2002 | Satou | 180/68.6 |
| 2005/0077095 A1 * | 4/2005 | Shigematsu | 180/68.4 |
| 2006/0063398 A1 * | 3/2006 | Witte | 439/66 |
| 2006/0082123 A1 * | 4/2006 | Dupuis et al. | 280/781 |
| 2006/0091664 A1 * | 5/2006 | Dupuis et al. | 280/781 |
| 2008/0063468 A1 * | 3/2008 | Wernlund et al. | 403/230 |
| 2008/0185872 A1 * | 8/2008 | Povinelli et al. | 296/193.09 |
| 2009/0266633 A1 * | 10/2009 | Obayashi et al. | 180/68.4 |
| 2009/0266634 A1 * | 10/2009 | Obayashi et al. | 180/68.4 |
| 2010/0314426 A1 * | 12/2010 | Yokoi et al. | 224/555 |
| 2012/0272607 A1 * | 11/2012 | Cooper et al. | 52/655.1 |
| 2014/0159429 A1 * | 6/2014 | Chung et al. | 296/193.09 |

\* cited by examiner

APPARATUS AND METHOD FOR JOINING A HYDRO-FORMED TUBE TO AN EXTRUSION

TECHNICAL FIELD

This disclosure relates to an assembly that includes a hydro-formed tube that is joined to an extruded part and the method of joining the parts together.

BACKGROUND

Joining two closed structures such as a hydro-formed tube and an extruded part together may create problems especially in the case of parts that are formed of aluminum. In a previous design disclosed in U.S. Pat. No. 8,550,545 assigned to applicant's assignee, an end of the hydro-formed tube is joined to an extruded part by abutting the tube against a side surface of the extruded part. Bridging plates are attached by fasteners to oppositely oriented surfaces of the hydro-formed tube and the extruded part.

One problem that may be encountered when joining closed hollow aluminum parts like hydro-formed parts and extruded tubular parts is that the strength of joints connecting the parts together may be limited. Another problem associated with the above prior art patent is that at least four parts in addition to the fasteners are necessary to join the parts. The use of four parts increases the number of manufacturing operations and the number of assembly fixtures required to hold the parts together during assembly.

This disclosure is directed to solving the above problems and other problems as summarized below.

SUMMARY

According to one aspect of this disclosure, an assembly is provided that includes a front end support frame and radiator support beam. The front end support frame has a tubular structure including four side walls. The front end support frame has an end that defines an opening that extends between two facing walls across one side of the tubular structure. The radiator support beam is disposed in the opening in the end of the front end support frame and is attached to the two facing walls to assemble the front end support frame to the radiator support beam.

According to other aspects of this disclosure, the assembly may also include a third wall extending between the two facing walls. The third wall may include an inner surface that faces the one side of the tubular structure that defines the opening and may be attached to an end of the radiator support. The radiator support beam may be secured with single-side fasteners to the two facing walls and a fourth wall.

According to other aspects of the method, the facing walls may be parallel walls that are disposed on opposite sides of the tubular structure. The front end support frame may have a rectangular cross-section.

The front end support frame may be a hydro-formed tube and the radiator support beam may include an extruded part. The radiator support beam may include at least one internal reinforcement wall and the fourth wall may be fastened with flow drilling screws to the at last one internal reinforcement wall.

Another aspect of this disclosure is a method of manufacturing a front end support frame and a radiator assembly. The method includes the steps of hydro-forming the front end support from a tubular blank including four side walls. An inside wall is trimmed at a terminal end of the front end support to define an opening that extends between two facing walls across one side of the tubular blank. A radiator support beam is extruded and assembled to the radiator support beam inside the opening. The two facing walls are then affixed to the radiator support beam.

According to other aspects of the disclosure as it relates to the method the radiator support beam may be an extrusion that has an internal reinforcement wall and the method may further comprise affixing an outside wall of the tubular blank to the internal reinforcement wall. The step of affixing the two facing walls to the radiator support beam and the step of affixing the outside wall of the tubular blank to the internal reinforcement wall may be performed by inserting flow drilling screws.

The method may further include the step of hydro-forming the front end support by selecting a round tube and hydro-forming the round tube into a rectangular cross-section tubular blank. The step of trimming the inside wall may further comprise forming the opening to a shape corresponding to a top surface of the radiator support beam and a front side and a rear side of the radiator support beam when assembled together.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
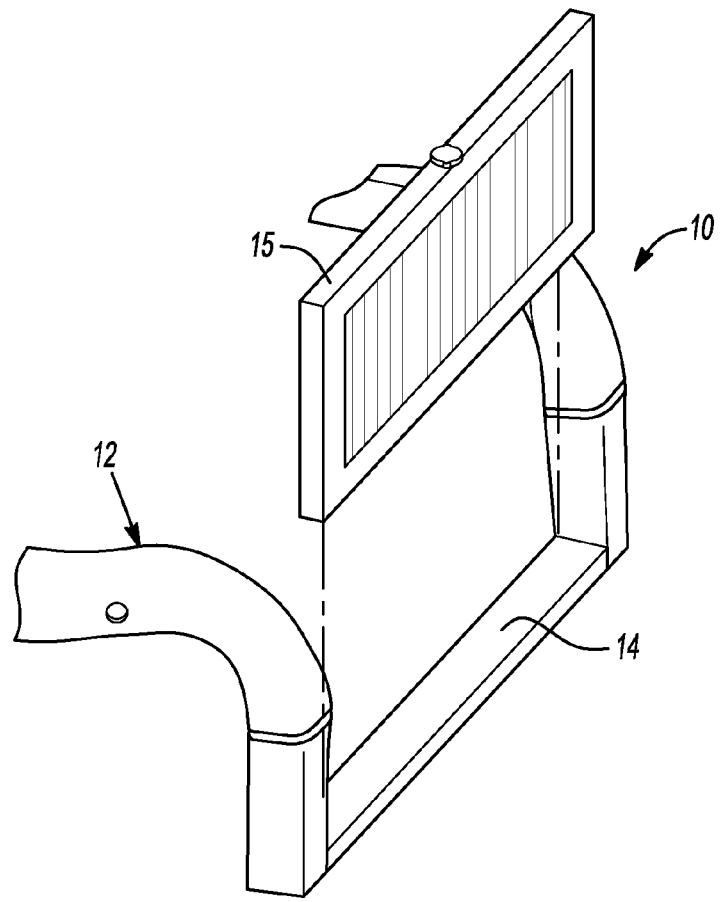
FIG. 1 is a fragmentary exploded perspective view of a vehicle front end assembly with a radiator shown separate from the front end assembly.

Referring to FIG. 1, a front end assembly 10 is generally indicated by reference numeral 10. A pair of front end, hydro-formed tubular support frames 12 are shown assembled to opposite ends of an extruded radiator support beam 14. The radiator support beam 14 supports the radiator 15. The two front end support frames 12 extend upwardly from the radiator support beam 14 on opposite sides of the radiator 15. Attachment of the right side support frame 12 to the radiator support beam 14 is described below with reference to FIGS. 2-4. Attachment of the left side support frame follows the same methodology.

Figure 2:
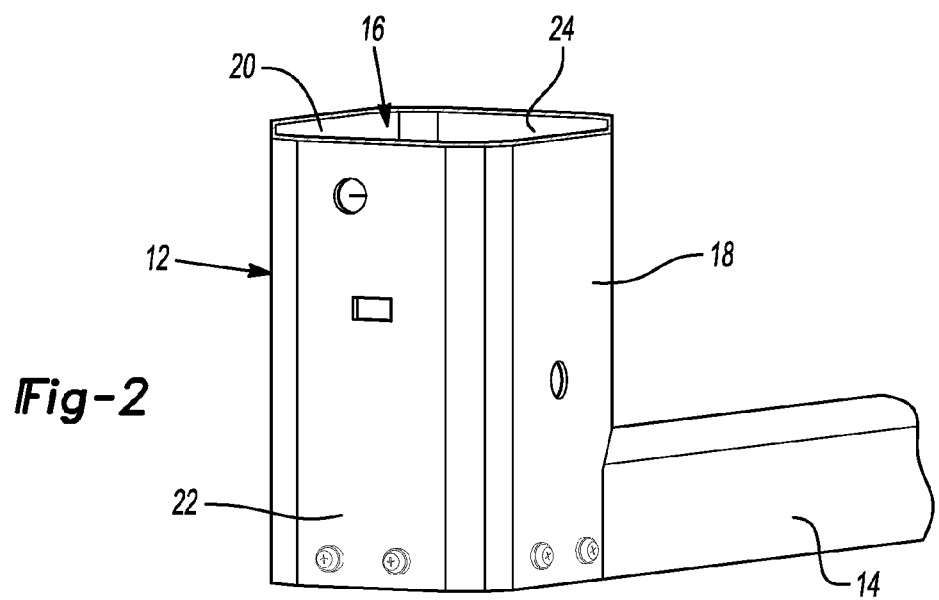
FIG. 2 is a fragmentary perspective view taken from the right front end.

Referring to FIG. 2, the front end support frame 12 may be an aluminum tubular structure 16. The tubular structure 16 includes a first transverse wall 18 and a second transverse wall 20. The transverse walls 18, 20 may also be referred to as "facing walls." An outside wall 22 and an inside wall 24, or third wall, extend between the first transverse wall 18 and the second transverse wall 20.

Figure 3:
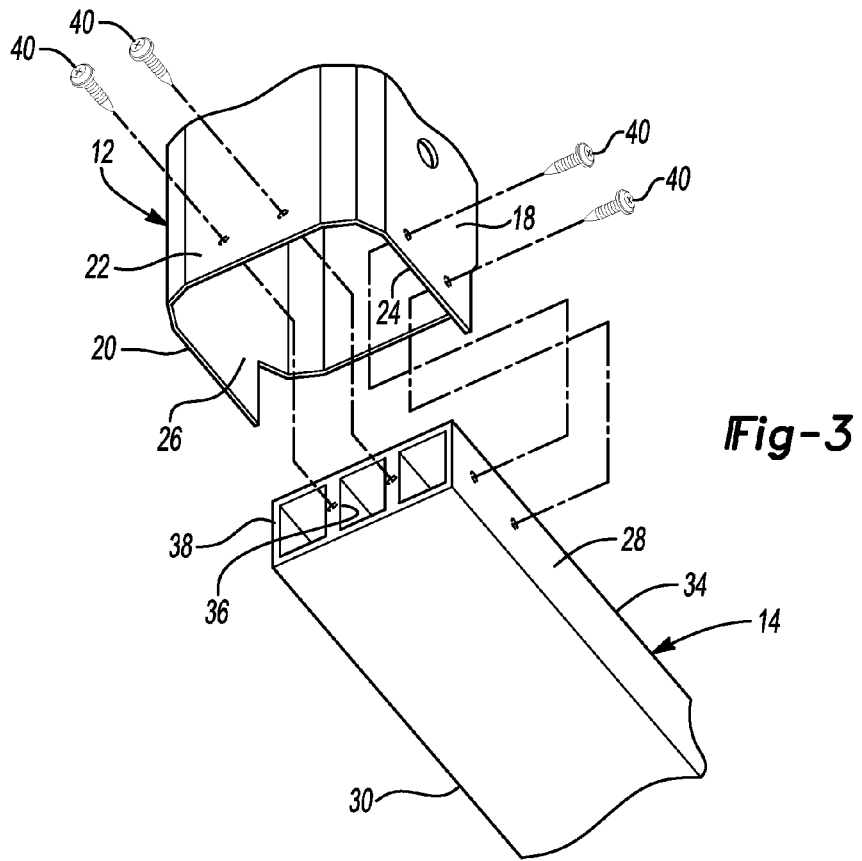
FIG. 3 is a fragmentary exploded perspective view taken from the lower right front end of a joint between a front end support frame and a radiator support beam.
Figure 4:
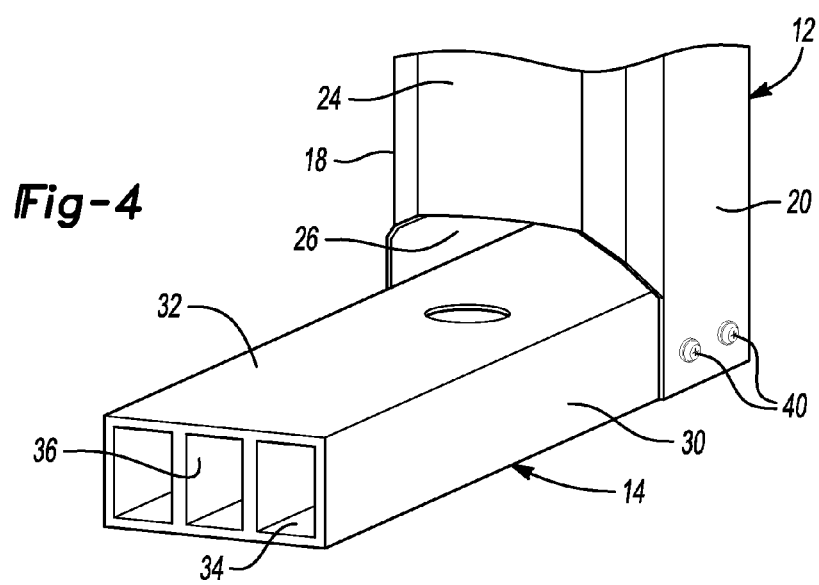
FIG. 4 is a right rear fragmentary perspective view of the joint between the front end support frame and the radiator support beam.

Referring to FIGS. 3 and 4, the inside wall 24, or third wall, defines an opening 26. Opening 26 is provided to receive the radiator support beam 14. The radiator support beam 14 includes a front wall 28 and a rear wall 30. The radiator support beam 14 is received in the front end support frame 12 through the opening 26. The front wall 28 of the radiator support beam 14 is secured to the first transverse wall 18 of the front end support frame 12. The rear wall 30 is secured to the second transverse wall 20. The radiator support beam 14 also includes a top wall 32 and a bottom wall 34. At least one internal enforcement wall 36 is formed within the radiator support beam 14. The radiator support beam 14 may be an extruded member formed of aluminum. The extrusion process integrally forms the internal reinforcement walls 36 that extend between the top wall 32 and bottom wall 34 at spaced locations relative to the front wall 28 and rear wall 30. An end 38 of the radiator support beam 14 is inserted inside the opening 26 and preferably engages the outside wall 22.

A plurality of flow drill screws 40, or other types of one-side joining fasteners, are inserted into the first and second transverse walls 18 and 20 and through the inside wall 24 to secure the front end support frame 12 to the radiator support beam 14. The flow drill screws 40 are received in the front wall 28, the rear wall 30 and the internal reinforcement walls 36 of the radiator support beam 14. Flow drill screws 40 offer the advantage of being installed from one side of the assembly and do not require access inside of the assembly. Pre-drilled holes are not necessary for flow drill screws.

The opening 26 in the inside wall 24 allows the radiator support beam 14 to be received within the front end support frame 12. The front end support frame 12 and radiator support beam 14 are directly connected to each other by the flow drill screws 40 to provide a strong and robust connection between the front end support frame 12 and the radiator support beam 14.

The method of manufacturing a front end support frame 12 and a radiator support beam 14 includes the steps of hydro-forming the front end support frame 12 from a tubular blank including four walls 18-24. One wall 22 is trimmed at a terminal end of the front end support frame 12 to define an opening 26 that extends between two facing walls 18, 20 across one side of the tubular blank. The radiator support beam 14 is extruded and assembled to the front end support frame 12 inside the opening 26. The two facing walls 18, 20 are then affixed to the radiator support beam 14.

The radiator support beam 14 may have an internal reinforcement wall 36 and the method may further comprise affixing a third wall 22 of the front end support frame 12 to the internal reinforcement wall 36. The step of affixing the two facing walls 18, 20 to the radiator support beam 14 and the step of affixing the third wall 22 of the front end support frame 12 to the internal reinforcement wall 36 may be performed by inserting flow drilling screws 40. Flow drilling screws 40 are one side fasteners that may be driven into the assembly from one side without the need to have access to the back side of the assembly. No pilot holes or receptacles are required in the radiator support beam 14 for the flow drilling screws 40.

The front end support frame 12 is formed by selecting a round tube and hydro-forming the round tube into a rectangular cross-section tubular blank. The inside wall 24 is trimmed to form an opening 26 having a shape corresponding to a top surface of the radiator support beam 14 and a front side 28 and a rear side 30 of the radiator support beam 14 when assembled together.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. An assembly comprising:
   a front end support frame having a tubular structure including four side walls, and having an end that defines an opening that extends between two facing walls across one side of the tubular structure; and
   a radiator support beam including a front wall and a rear wall that are each attached inside one of the two facing walls to assemble the front end support frame to the radiator support beam, wherein the radiator support beam is an extruded part that includes a top wall and a bottom wall that extend between the front wall and the rear wall, wherein the radiator support beam includes at least one internal reinforcement wall extending between the top wall and the bottom wall, and wherein the two facing walls are fastened with flow drilling screws to the radiator support beam, and wherein an outer wall is fastened with flow drilling screws to the at last one internal reinforcement wall.

2. The assembly of claim 1 wherein the outer wall extends between the two facing walls and faces the side of the tubular structure that defines the opening.

3. The assembly of claim 1 wherein the facing walls are parallel and disposed on opposite sides of the tubular structure.

4. The assembly of claim 1 wherein the front end support frame is rectangular.

5. The assembly of claim 1 wherein the front end support frame is a hydro-formed tube.

6. A radiator support assembly comprising:
   right and left tubular members each having front walls, rear walls and outer walls, wherein an inner wall of the tubular members each define an opening;
   an extruded beam having an internal reinforcement wall, the beam being received in each of the openings and attached by fasteners inserted through the front and rear walls, wherein fasteners inserted through the outer walls are fastened to the internal reinforcement wall.

7. The assembly of claim 6 wherein the outer walls extend between the front and rear walls and are on the opposite side of the tubular structure from the inner walls that define the openings.

8. The assembly of claim 6 wherein the front wall and rear wall are parallel and disposed on opposite sides of the tubular members.

9. The assembly of claim 6 wherein the right and left tubular members are rectangular.

10. The assembly of claim 6 wherein the right and left tubular members are hydro-formed tubes.

* * * * *